US010086751B2

(12) United States Patent
Salter et al.

(10) Patent No.: US 10,086,751 B2
(45) Date of Patent: Oct. 2, 2018

(54) VEHICLE LIGHTING SYSTEM HAVING A SPOTLIGHT

(71) Applicant: Ford Global Technologies, LLC, Dearborn, MI (US)

(72) Inventors: Stuart C. Salter, White Lake, MI (US); Aaron Bradley Johnson, Allen Park, MI (US); James J. Surman, Clinton Township, MI (US); Pietro Buttolo, Dearborn Heights, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/192,726

(22) Filed: Jun. 24, 2016

(65) Prior Publication Data

US 2017/0368983 A1    Dec. 28, 2017

(51) Int. Cl.
  *B60Q 1/00*      (2006.01)
  *B60Q 1/24*      (2006.01)
  *F21V 14/02*     (2006.01)
  *F21V 19/00*     (2006.01)
  *F21V 21/30*     (2006.01)
  *F21V 23/04*     (2006.01)
  *F21Y 115/10*    (2016.01)
  *F21W 107/10*    (2018.01)

(52) U.S. Cl.
  CPC .............. *B60Q 1/24* (2013.01); *B60Q 1/0035* (2013.01); *B60Q 1/0076* (2013.01); *F21V 14/02* (2013.01); *F21V 19/003* (2013.01); *F21V 21/30* (2013.01); *F21V 23/0435* (2013.01); *B60Q 2900/30* (2013.01); *F21W 2107/10* (2018.01); *F21Y 2115/10* (2016.08)

(58) Field of Classification Search
  CPC .......... B60Q 1/0483; B60Q 1/18; B60Q 1/24; B60Q 1/245; B60Q 1/2611; F21S 48/1742; F21S 48/1747; F21V 5/046
  See application file for complete search history.

(56) References Cited

U.S. PATENT DOCUMENTS

| 4,779,168 | A | 10/1988 | Montgomery |
| 6,260,988 | B1 | 7/2001 | Misawa et al. |
| 7,354,182 | B2 | 4/2008 | Bartels |
| 7,458,698 | B2 | 12/2008 | Heathcock et al. |
| 8,103,414 | B2 | 1/2012 | Boss et al. |
| 8,201,974 | B1 * | 6/2012 | Smith .................... B60Q 1/245 315/118 |
| 8,408,765 | B2 | 4/2013 | Kuhlman et al. |

(Continued)

FOREIGN PATENT DOCUMENTS

| CN | 202357840 U | 8/2012 |
| CN | 104869728 A | 8/2015 |

(Continued)

*Primary Examiner* — Alexander Garlen
(74) *Attorney, Agent, or Firm* — Jason Rogers; Price Heneveld LLP

(57) ABSTRACT

A lighting system of a vehicle is provided herein. The lighting system includes a structure of the vehicle and a spotlight having a body coupled to the structure. A light assembly is disposed inside the body and is configured to project a light beam outwardly from the body. The operation of the light assembly and the directionality of the light beam is based on input from a remote device.

17 Claims, 3 Drawing Sheets

(56) References Cited

U.S. PATENT DOCUMENTS

| | | |
|---|---|---|
| 8,606,430 B2 | 12/2013 | Seder et al. |
| 8,937,454 B2 | 1/2015 | Baarman et al. |
| 8,963,705 B2 | 2/2015 | Miller et al. |
| 9,194,168 B1 | 11/2015 | Lu et al. |
| 9,442,888 B2 | 9/2016 | Stanfield et al. |
| 9,579,987 B2 | 2/2017 | Penilla et al. |
| 2005/0047142 A1* | 3/2005 | Lui ................. B60Q 1/245 362/275 |
| 2007/0030136 A1 | 2/2007 | Teshima et al. |
| 2007/0195939 A1 | 8/2007 | Sink et al. |
| 2008/0025020 A1* | 1/2008 | Kolb ................. F21V 5/04 362/241 |
| 2010/0259945 A1* | 10/2010 | Chiu ................. B60Q 1/245 362/428 |
| 2012/0020101 A1 | 1/2012 | Pastrick et al. |
| 2012/0120673 A1* | 5/2012 | Anderson .......... B60Q 1/245 362/514 |
| 2013/0009855 A1 | 1/2013 | Gally et al. |
| 2013/0154821 A1 | 6/2013 | Miller et al. |
| 2013/0300556 A1* | 11/2013 | Wang ................. B60Q 1/245 340/471 |
| 2014/0126214 A1* | 5/2014 | Gebhard ............. F21V 29/02 362/294 |
| 2014/0177258 A1* | 6/2014 | Gebhard ............. B60Q 1/245 362/547 |
| 2014/0288832 A1 | 9/2014 | Hoch et al. |
| 2014/0354423 A1* | 12/2014 | Luei ................. G08B 5/002 340/468 |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0082880 A1 | 3/2016 | Co et al. |
| 2016/0214535 A1 | 7/2016 | Penilla et al. |
| 2017/0213165 A1 | 7/2017 | Stauffer et al. |

FOREIGN PATENT DOCUMENTS

| | | |
|---|---|---|
| CN | 105303642 A | 2/2016 |
| EP | 2715980 A1 | 4/2014 |
| EP | 2719580 A1 | 4/2014 |
| JP | 2000052859 A | 2/2000 |
| WO | 2008093266 A1 | 8/2008 |

\* cited by examiner

VEHICLE LIGHTING SYSTEM HAVING A SPOTLIGHT

FIELD OF THE INVENTION

The present invention generally relates to lighting systems of a vehicle, and more particularly, to lighting systems having a spotlight.

BACKGROUND OF THE INVENTION

Some vehicles include spotlights such as roof marker lights, which typically project a light beam in a single predefined direction. Accordingly, such spotlights are rather limited in their functionality. Accordingly, there is a need for a spotlight that provides an operator with a means to adjust the directionality of the light beam.

SUMMARY OF THE INVENTION

According to one aspect of the present invention, a lighting system of a vehicle is provided. The lighting system includes a roof structure and a spotlight. The spotlight includes a base fixedly coupled to the roof structure, a body pivotally coupled to the base, and a light assembly pivotally disposed inside the body and configured to project a light beam outwardly from the body. A controller is provided for controlling the operation of the light assembly and the directionality of the light beam based on communication with a remote device.

According to another aspect of the present invention, a spotlight for a vehicle is provided. The spotlight includes a body coupled to a structure of the vehicle. A light assembly is disposed inside the body and is configured to project a light beam outwardly from the body. The operation of the light assembly and the directionality of the light beam is based on input from a remote device.

According to yet another aspect of the present invention, a lighting system of a vehicle is provided. The lighting system includes a roof structure and a spotlight having a body coupled to the roof structure. A light assembly is disposed inside the body and has a multi-directional light array configured to project a light beam outwardly from the body. A controller is provided for controlling the operation of the light assembly and the directionality of the light beam based on input from a remote device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
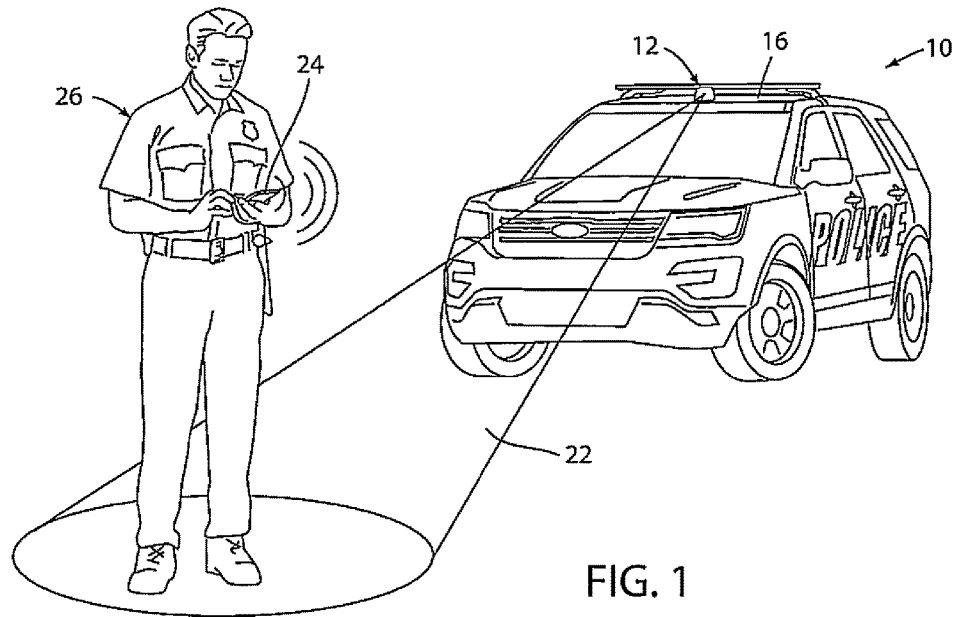
FIG. 1 illustrates a vehicle equipped with a spotlight having multi-directional lighting, according to one embodiment.
Figure 2:
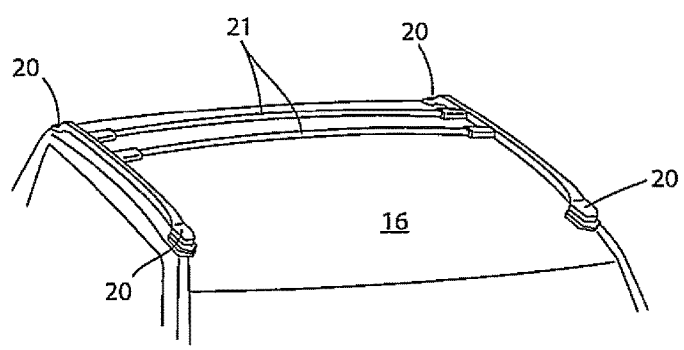
FIG. 2 illustrates a roof rack and points thereon for alternative placement of the spotlight.

Referring to FIG. 1, a vehicle 10 is generally depicted as a sports utility vehicle (SUV). A spotlight 12, exemplarily configured as a roof marker light, is provided on a roof structure 16 of the vehicle 10, the roof structure 16 being generally depicted as a roof panel. In alternative embodiments, the spotlight 12 may be provided elsewhere on the vehicle 10. For example, the spotlight 12 may be packaged in a roof rack 18 of the vehicle 10 at a corner portion 20 or a cross bar 21 (FIG. 2). While a single spotlight 12 is depicted in FIG. 1, it is to be understood that the vehicle 10 may be equipped with multiple spotlights located variously on the roof structure 16 or elsewhere on the vehicle 10. In operation, the spotlight 12 is configured to project a light beam 22 away from the vehicle 10. The directionality of the light beam 22 may be controlled using a remote device 24 generally depicted as a smartphone, but may also include vehicle equipment such as a center console. Accordingly, it is to be understood that the remote device 24 may include portable and non-portable electronic devices. In operation, an operator 26 may utilize the remote device 24 to aim the light beam 22 in a variety of directions to suit his or her needs. Furthermore, in portable embodiments of the remote device 24, the operator 26 may aim the light beam 22 whilst the operator 26 is inside or outside the vehicle 10. In some embodiments, the spotlight 12 is operable such that the directionality of the light beam 22 is determined based on a sensed location of the remote device 24. As exemplarily shown in FIG. 1, the light beam 22 is directed to illuminate the ground below and/or next to the operator 26 carrying the remote device 24. Thus, as the operator 26 moves relative to the vehicle 10, the light beam 22 effectively follows the operator 26 so long as the remote device 24 is detected. It will be apparent to those skilled in the art that these and other features of the spotlight 12, as described herein, may be variously implemented in a multitude of applications. Thus, while the present disclosure provides some exemplary scenarios, those skilled in the art will undoubtedly recognize other ways in which to use the spotlight 12 without departing from the teachings provided herein.

Figure 3:
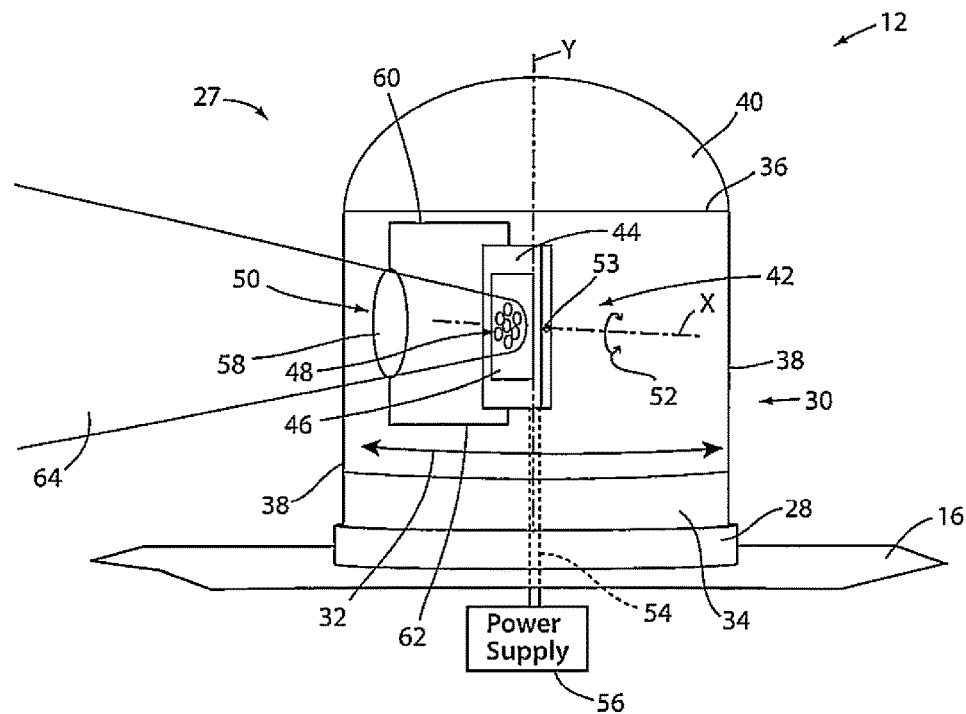
FIG. 3 illustrates the spotlight according to one embodiment.

Referring to FIG. 3, the spotlight 12 is shown according to one embodiment and includes a housing assembly 27 pivotally coupled to the roof structure 16. The housing assembly 27 includes a circular planar base 28 affixed to the roof structure 16 using mechanical fasteners or other known means. The base 28 may be constructed from a rigid material. The housing assembly 27 also includes a cylindrical body 30 concentrically aligned with the base 28 and coupled thereto to pivot about a vertical axis Y extending through the common center of the body 30 and the base 28 such that the body 30 is rotatable in either a leftward direction or a rightward direction as generally represented by dual directional arrow 32. It is contemplated that the body 30 may be fully rotatable (e.g., 360 degrees) or otherwise limited to a degree of rotation in one or both the leftward and rightward directions. The body 30 may be constructed from a rigid material and is defined by a closed bottom end 34 most proximate to the base 28, an open top end 36, and a light-transmissive peripheral wall 38 extending vertically between the bottom and top ends 34, 36. A cover 40 is affixed to the top end 36 of the body 30 and generally functions to seal the contents thereof. The cover 40 may be rounded and constructed from a rigid or elastic material. Additionally, the cover 40 may be light-transmissive or light-blocking.

With continued reference to FIG. 3, a light assembly 42 is pivotally disposed inside the body 30 of the housing assembly 27 and includes a substrate 44 configured to support a printed circuit board (PCB) 46 having a light-emitting diode (LED) arrangement 48 thereon and an optional lens assembly 50 in optical communication with the LED arrangement 48. The substrate 44 is secured within the body 30 and is pivotable about a horizontal axis X extending laterally across the middle of the substrate 44 such that the substrate 44 and components supported thereby can be rotated in either an upward direction or a downward direction as generally represented by dual directional arrow 52. In some embodiments, the horizontal axis X may intersect with the vertical axis Y such that the light assembly 42 is rotatable in a leftward/rightward direction and an upward/downward direction about a point of intersection 53 between the horizontal axis X and the vertical axis Y. The degree of rotation in both the upward and downward directions may be unrestricted or otherwise limited. According to one embodiment, the degree of rotation in both the upward and downward direction is limited to approximately 30 degrees.

While the substrate 44 is depicted as being planar, it may be curved in alternative embodiments, in embodiments where the substrate 44 is curved, the PCB 46 may be configured as a flex circuit to match the contour of the substrate 44. The LED arrangement 48 may include a cluster of LEDs configured to emit light towards the lens assembly 50. The LED arrangement 48 may emit light of the same color or be apportioned to selectively emit different colored light. Electrical power is supplied to the LED arrangement 48 via wiring 54 extending through the substrate 44 and the bottom end 34 of the body 30 and electrically coupled to a vehicle power supply 56. The lens assembly 50 includes a lens 58 supported by a pair of arms 60, 62 connected to the substrate 44. The lens 58 is positioned between the LED arrangement 48 and the peripheral wall 38 of the body 30 and is configured to focus, collimate, or spread light emitted by the LED arrangement 48 so as to project a light beam 64 of variable light density outwardly from the body 30 through the peripheral wall 38. In embodiments where the lens 58 collimates light emitted by LED arrangement 48, the lens 58 may be fluted, the flutes having varying width, height, and depth. Furthermore, the beam pattern of the projected light beam 64 may be defined based on an optical interaction between the lens 58 and the peripheral wall 38. Accordingly, it is to be appreciated that the peripheral wall 38 may be configured to exhibit various optical characteristics.

Figure 4:
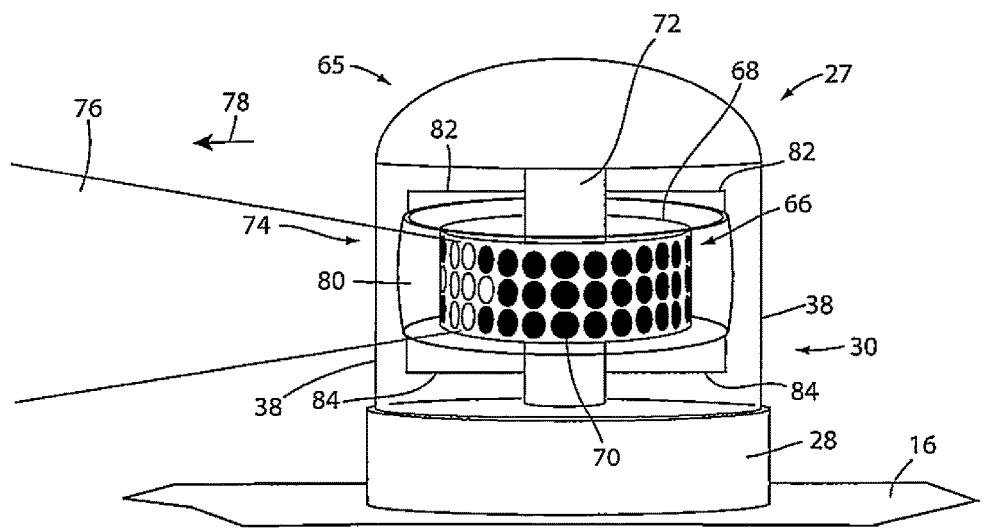
FIG. 4 illustrates the spotlight according to another embodiment.

Referring to FIG. 4, a spotlight 65 is shown according to an alternative embodiment. The spotlight 65 includes the housing assembly 27 described above with reference to FIG. 2. However, in the presently depicted embodiment, the body 30 is not pivotally coupled to the base 28. As such, the base 28 may be omitted in favor of directly coupling the body 30 to the roof structure 16. Alternatively, the body 30 and base 28 may be unitary in construction. A light assembly 66 is provided inside the housing assembly 27 and includes a multi-directional light array defined by a PCB 68 having a circular arrangement and a plurality of LEDs 70 disposed thereon. The PCB 68 may be a flex circuit and is supported by a substrate 72 fixedly secured within the housing assembly 27. As shown, the plurality of LEDs 70 are exemplarily arranged in three rows of equal number and span a substantial entirety of the PCB 68. In alternative embodiments, the number of rows may be different in number along with pattern in which the LEDs 70 are distributed. For purposes of illustration, an arbitrary number of LEDs 70 are undarkened to represent an LED cluster that is selectively activated to emit light outwardly from the body 30 through the peripheral wall 38. It should be appreciated that other LED clusters may be activated to emit light having a different directionality by virtue of the location of the LED clusters on the PCB 68. Furthermore, by modifying the number of LEDs 70 in a given cluster, the intensity and/or spread of the associated light emission may be adjusted. With respect to the embodiments described herein, the intensity of the emitted light may also be adjusted through pulse-width modulation (PWM) or direct current control.

With respect to the presently depicted embodiment, a lens assembly 74 may be optionally provided to focus, collimate, or spread light emitted by the LED cluster so as to project a light beam 76 of variable light density outwardly from the body 30 through the peripheral wall 38 in the direction generally specified by arrow 78. The lens assembly 74 includes a lens 80 in optical communication with the LEDs 70 and is fixedly supported within the housing assembly 27 by any suitable means. The lens 80 may be positioned between the multi-directional light array and the peripheral wall 38 and may be secured by one or more pairs of arms 82, 84 connected to the substrate 72 or otherwise secured within the housing assembly 27. The lens 80 is generally positioned inside the housing assembly 27 to intercept light emitted from the LEDs 70 and project the corresponding light beam through the peripheral wall 38 of the body 30. In some embodiments, the lens 80 may be fluted, the flutes having varying width, height, and depth. Also, the projected light beam 76 may be defined based on an optical interaction between the lens 80 and the peripheral wall 38. Accordingly, it is to be appreciated that the peripheral wall 38 may be configured to exhibit various optical characteristics.

In the depicted embodiment, the lens 80 is configured to enclose the multi-dimensional light array. That is, when the spotlight 65 is viewed from the top, the multi-dimensional array is a small circle enclosed by a larger circle corresponding to the lens 80. The lens 80 may be configured to project a light beam in a straight forward direction or otherwise project the light beam at an upward or downward angle relative to the ground. While the multi-directional light array has been shown to provide 360 degree lighting, it is to be understood that the multi-directional light array may be limited to smaller degree ranges, thereby limiting the available directionality of a light emitted by the LEDs 70, if desired.

Due to the lack of any movable parts, the spotlight 65 described with reference to FIG. 4 may be manufactured at a lower cost when compared to that described with reference to FIG. 2. Furthermore, the lack of movable parts also enables the spotlight 65 to benefit from a smaller size, thereby enabling it to be more easily integrated with various structures of the vehicle 10 (e.g., roof rack 18; FIG. 1). While the housing assembly 27 of spotlights 12 and 65 has been described herein as having a particular disposition, it is to be understood that the housing assembly 27 may take on other shapes and configurations to adapt to various structures of the vehicle 10 without adversely impacting the functionality of the spotlight 12, 65.

Figure 5:
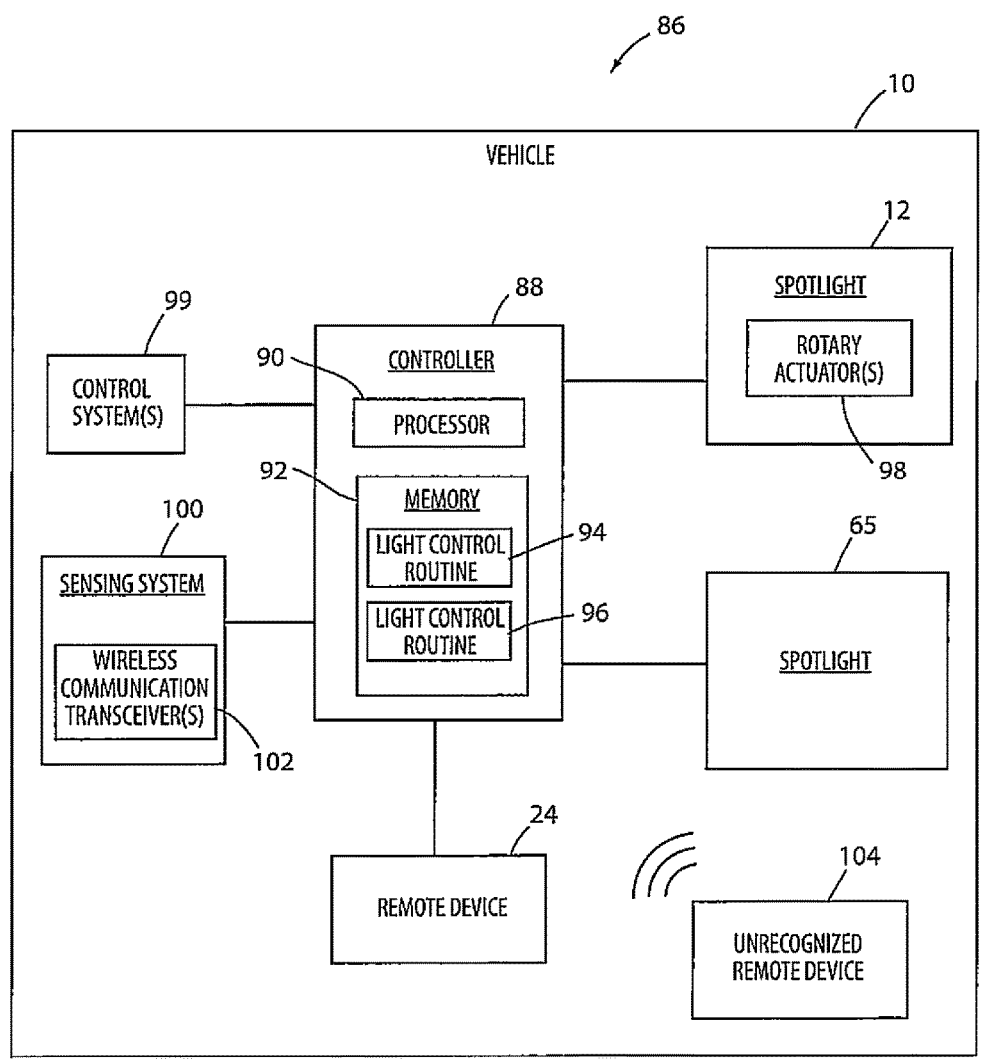
FIG. 5 is a block diagram of a lighting system that includes the spotlights of FIGS. 3 and 4.

Referring to FIG. 5, a lighting system 86 is shown according to one embodiment and exemplarily includes spotlights 12 and 65, each of which may be mounted to the same or different structure of the vehicle 10. As shown a controller 88 is operably coupled to each spotlight 12, 65. In alternative embodiments, each spotlight 12, 65 may be controlled by a separate controller located on their respective PCBs 46, 68 or elsewhere located in the vehicle 10. In the presently depicted embodiment, the controller 88 may be a dedicated controller or may be shared with other vehicle equipment. The controller 88 includes a processor 90 and a memory 92 for storing one or more routines that are executable by the processor 90. For example, the memory 92 may store a light control routine 94 for controlling spotlight 12 and another light control routine 96 for controlling spotlight 65.

According to one embodiment, the controller 88 operates spotlights 12, 65 based on input received from the remote device 24. Accordingly, the light control routines 94, 96 may also include instructions allowing communication between the controller 88 and the remote device 24. Alternatively, such instructions may be embodied in a separate routine stored in the memory 92 of the controller 88. As described herein, the remote device 24 may include a portable electronic device such as a smartphone or vehicle equipment such as a center console. In embodiments where the remote device 24 is a portable electronic device, an operator may use the remote device 24 to wirelessly communicate with the controller 88 via any known wireless communication protocol such as Bluetooth™, Wi-Fi™, and the like. Accordingly, the remote device 24 may include one or more routines for enabling communication between the remote device 24 and the controller 88. For example, in smartphone embodiments of the remote device 24, the smartphone may include an application enabling the operator to activate the spotlights 12, 65 and effectively aim the direction in which to project a light beam.

In regards to spotlight 12, the operator may use the smartphone to enter commands for turning ON the light assembly 42 as well as rotating the body 30 of the housing assembly 27 and/or the light assembly 42 in order to aim the light beam in a desired direction. Thus, by virtue of the body 30 and the light assembly 42 being pivotable, the operator is able to aim the light beam in a left/right rotational direction and an up/down rotational direction, thereby adjusting the directionality of the light beam in two dimensions. In such embodiments, the spotlight 12 may include one or more rotary actuators 98 operably coupled to the controller 88 for achieving rotational movement of the body 30 and light assembly 42.

In regards to spotlight 65, the operator may similarly use the smartphone for turning ON the light assembly 66. For example, the operator may enter commands through the smartphone that are inputted to the controller 88 for selectively activating an LED cluster. In this instance, the directionality of the resultant light beam is based on the location of the activated LED cluster within the housing assembly 27. It is contemplated that the number of LEDs 70 in a selected LED cluster may be modified using the remote device 24 or is predefined by the vehicle manufacturer. Since the light assembly 66 of spotlight 65 does not provide upward or downward aiming of a light beam, the operator is generally limited to aiming the light beam in a leftward or rightward direction by selectively activating the appropriate LED cluster. However, it is contemplated that the light assembly 66 may be configured such that a light beam may be aimed in an upward direction or a downward direction if desired. However, doing so may increase the packaging requirements of the spotlight 65. With respect to the operation of spotlights 12 and 65, it is also contemplated that the operator may input commands using the remote device 24 for controlling the intensity and color of a light beam.

In embodiments where the remote device 24 is a center console or other vehicle equipment, the operator may input commands for controlling the spotlights 12, 65 in a similar manner as that described above with respect to the smartphone. The vehicle equipment may be connected to the controller 88 and made to communicate with the same via a vehicle network such as a CAN bus, a LIN bus, or the like. In any of the embodiments described herein, the remote device 24 may include a touchscreen with which the operator may input his or her commands.

In operation, the controller 88 may operate the spotlights 12, 65 to effectuate a variety of lighting controls based on input from the remote device 24. For example, an operator may input commands using the remote device 24 to aim a light beam toward a desired location in order to perform a task in dark conditions. Selective aiming of a light beam may prove especially useful in certain professions, such as law enforcement, where an officer may use the remote device 24 to aim the light beam towards a suspected offender or vehicle that has been pulled over due to a traffic violation, for example. Other professionals such as firemen, paramedics, etc. may similarly benefit. In some embodiments, the controller 88 may communicate with one or more control systems 99 of the vehicle 10 and operate the spotlights 12, 65 in response to information received from the control systems 99. For example, if mounted toward the rear of the vehicle 10, the spotlights 12, 65 may be operated as backup lights based on an indication that the vehicle 10 is placed in reverse. If mounted toward the front of the vehicle 10, the spotlights 12, 65 may be operated as headlights or cornering lights when the vehicle 10 based on an indication that the vehicle 10 is in drive or engaged in a turning maneuver. These are but a few exemplary scenarios showcasing the utility of the spotlights 12, 65 described herein. It is to be understood that the spotlights 12, 65 may be variously operated by the controller 88 in other scenarios based on input from the remote device 24 and/or the control system(s) 99 of the vehicle 10.

With further reference to FIG. 5, the lighting system 86 may include a sensing system 100 operably coupled to the controller 88 for detecting the location of the remote device 24. The sensing system 100 may include one or more wireless communication transceivers 102 configured to interact with the remote device 24. The wireless communication transceiver(s) 102 may communicate with the remote device 24 over a wireless signal (e.g., radio frequency). In a specific example, the wireless communication transceiver(s) 102 may be a Bluetooth™ RN4020 module or an RN4020 Bluetooth™ low energy PICtail board configured to communicate with the remote device 24 using Bluetooth™ low energy signals. The wireless communication transceiver(s)

102 may include a transmitter and a receiver to transmit and receive wireless signals (e.g., Bluetooth™ signals) to and from the remote device 24. It will be appreciated that the wireless communication transceiver(s) 102 may utilize other forms of wireless communication with the remote device 24 such as Wi-Fi™. The wireless communication transceiver(s) 102 may be positioned on or within the controller 88 or be located elsewhere on the vehicle 10. For example, some or all of the wireless communication transceiver(s) 102 may be located at a rear, side, and/or front portion of the vehicle 10.

The controller 88 and/or the remote device 24 may include one or more routines which control the communication between the wireless communication transceivers(s) 102 and the remote device 24. For example, instructions for controlling the communication between the wireless communication transceiver(s) 102 and the remote device 24 may be included in the light control routines 94, 96 and executed by the processor 90 of the controller 88. In operation, the remote device 24 may communicate with all, some, or none of the wireless communication transceiver(s) 102 as the remote device 24 enters and exits the communication range of the wireless communication transceiver(s) 102. The wireless communication transceiver(s) 102 may be aware of its location within the vehicle 10 and is capable of sharing its location with the remote device 24. In various embodiments, the wireless communication transceiver(s) 102 are capable of communicating with the remote device 24 such that the location of the remote device 24 may be determined therefrom (e.g., based on signal strength and/or return time of the signal) or vice versa.

According to one embodiment, the controller 88 may utilize the signal strength and time to return of the signals between the wireless communication transceiver(s) 102 and the remote device 24 to triangulate the position of the remote device 24 as the person carrying it is approaching or leaving the vehicle 10. In response, the controller 88 may operate the one or both of the spotlights 12, 65 to project a light beam that effectively follows the remote device 24, if possible. As defined herein, the term "follow" may be construed to mean that the light beam is projected directly toward the location of the remote device 24 or toward a location in close proximity thereof. For example, in smartphone embodiments of the remote device 24, the smartphone is generally carried in a person's pocket or hand, and as such, the controller 88 may be configured to operate the spot lights 12, 65 to project a light beam below the position of the smartphone so as to illuminate the ground below or proximate the person. The remote device 24 and/or controller 88 may store user specific data and preferences relating to the operation of the spot lights 12, 65 (e.g., color, intensity, pattern, activation distance, etc.).

Choosing whether the remote device 24 should be trusted and therefore given access to communicate with the controller 88 and the wireless communication transceiver(s) 102 may be determined based on whether the remote device 24 has been inside of the vehicle 10 before. According to one embodiment, the memory 92 of the controller 88 may store identifying information relating to remote devices 24 which were detected within the vehicle 10 and which may therefore be generally regarded as "friendly" and/or as the owner of the vehicle 10. In an exemplary method of determining that an unknown remote device 24 is friendly, the wireless communication transceiver(s) 102 detect the presence of an unknown remote device 24, detect a characteristic signal shift (e.g., attenuation or increase in signal at the wireless communication transceiver(s) 102) indicative of the unknown remote device 24 entering or being within the vehicle 10 across multiple wireless communication transceiver(s) 102, and store characteristic information about the remote device 24 for future identification. It will be understood that a determination of the location of the remote device 24 to be within the vehicle 10 may also prompt a storing of the characteristic information on the remote device 24 for future identification. Utilizing the past and/or present location of the remote device 24 as a security feature to determine if it is allowed access to the controller 88 may be particularly advantageous as the replication of signal shifting indicative of the remote device 24 entering the vehicle 10 and the location of the remote device 24 is particularly difficult to fake. Further, it will be understood that more conventional methods of connecting portable electronic devices such as pairing and manually connecting may also be utilized to designate one or more remote devices 24 as being friendly.

The detecting capabilities of the wireless communication transceiver(s) also permits the controller 88 to determine if an unrecognized remote device 104 is proximate the vehicle 10. Such an unrecognized remote device 104 may be owned or carried by a potential burglar or threat to the vehicle 10. In events where an unrecognized remote device 104 is detected proximate the vehicle 10 for greater than a predetermined time, the controller 88 may initiate one or more counter measures. Countermeasures may include strobing the spotlights 12, 65 or projecting a light beam at the unrecognized remote device 104, effectively following the person carrying the unrecognized remote device 104. In some embodiments, any available identifying information about the unrecognized remote device 104 may be stored for later retrieval in instances where the friendly remote device 24 is not detected proximate the vehicle 10 at the same time, for example. The controller 88 may store the identifying information in its memory 92. Such identifying information may prove useful in the event the vehicle 10 becomes compromised due to theft, damage, and the like.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system of a vehicle, comprising:
   a roof structure;
   a spotlight comprising:
   a base fixedly coupled to the roof structure;
   a body pivotally coupled to the base; and
   a light assembly pivotally disposed inside the body and configured to project a light beam outwardly from the body, the light assembly comprising a substrate, a printed circuit board disposed on the substrate and having an LED cluster thereon, and a lens supported by one or more arms connected to the substrate;
   and a controller for controlling the operation of the light assembly and the directionality of the light beam based on communication with both recognized and unrecognized remote devices, wherein the light assembly illuminates in a first manner for a recognized remote device and a second manner for an unrecognized remote device.

2. The lighting system of claim 1, wherein the spotlight is configured as a roof marker light.

3. The lighting system of claim 1, wherein the body is pivotable about a vertical axis and the light assembly is pivotable about a horizontal axis.

4. The lighting system of claim 1, wherein the remote device is one of a portable electronic device and a vehicle equipment.

5. The lighting system of claim 1, wherein the one or more arms comprise a pair of arms and the lens is positioned between the LED cluster and a peripheral wall of the body and is configured to focus, collimate, or spread light emitted by the LED cluster.

6. The lighting system of claim 1, further comprising a sensing system in communication with the controller and configured to detect the location of the remote device, wherein the controller operates the spotlight to project the light beam in a general direction toward the remote device.

7. A spotlight for a vehicle, comprising:
a body coupled to a structure of the vehicle; and
a light assembly disposed inside the body and configured to project a light beam outwardly from the body, the light assembly comprising a substrate, a printed circuit board disposed on the substrate and having an LED cluster thereon, and a lens supported by a pair of arms connected to the substrate, wherein the operation of the light assembly and the directionality of the light beam is based on input from both recognized and unrecognized remote devices, wherein the light assembly illuminates in a first manner for a recognized remote device and a second manner for an unrecognized remote device.

8. The spotlight of claim 7, wherein the structure is a roof structure of the vehicle.

9. The spotlight of claim 7, wherein the directionality of the light beam is adjustable in two dimensions.

10. The spotlight of claim 7, wherein the body is pivotable in a rightward or leftward direction.

11. The spotlight of claim 10, wherein the light assembly is pivotable in an upward or downward direction.

12. A lighting system of a vehicle, comprising:
a roof structure;
a spotlight comprising:
a body coupled to the roof structure;
a light assembly disposed inside the body and having a multi-directional light array configured to project a light beam outwardly from the body, the multi-directional array defined by a cylindrical PCB circumferentially and fixedly disposed around a vertical substrate and a plurality of LEDs disposed on the cylindrical PCB; and
a controller for controlling the operation of the light assembly and the directionality of the light beam based on input from both recognized and unrecognized remote devices, wherein the light assembly illuminates in a first manner for a recognized remote device and a second manner for an unrecognized remote device.

13. The lighting system of claim 12, wherein the spotlight is configured as a roof marker light.

14. The lighting system of claim 12, wherein the body is fixedly coupled to the roof structure.

15. The lighting system of claim 12, wherein the remote device is one of a portable electronic device and a vehicle equipment.

16. The lighting system of claim 12, wherein the light assembly further comprises a lens assembly having a cylindrical lens supported by one or more arms connected to the vertical substrate and configured to focus, collimate, or spread light emitted from one or more LED clusters.

17. The lighting system of claim 12, further comprising:
a sensing system in communication with the controller and configured to detect the location of the remote device, wherein the controller operates the spotlight to project the light beam in a general direction toward the remote device.

* * * * *